United States Patent [19]

Mori et al.

[11] Patent Number: 4,953,011
[45] Date of Patent: Aug. 28, 1990

[54] COLOR ENHANCING CIRCUIT FOR ENHANCING SATURATION

[75] Inventors: Takeshi Mori, Machida; Hiroyoshi Fujimori, Hachioji; Tatsuo Nagasaki, Musashino, all of Japan

[73] Assignee: Olympus Optical Co., Ltd., Tokyo, Japan

[21] Appl. No.: 167,821

[22] Filed: Mar. 11, 1988

[30] Foreign Application Priority Data

Mar. 24, 1987 [JP] Japan .................................. 62-69912
Aug. 13, 1987 [JP] Japan ................................. 62-202730

[51] Int. Cl.$^5$ .............................................. H04N 9/68
[52] U.S. Cl. ...................................... 358/37; 358/28; 358/98
[58] Field of Search ....................... 358/98, 27, 28, 37, 358/23

[56] References Cited

U.S. PATENT DOCUMENTS

| 4,498,097 | 2/1985 | Fujimoto | 358/12 |
| 4,622,584 | 11/1986 | Nagasaki et al. | 358/98 |
| 4,737,842 | 4/1988 | Nagasaki | 358/28 |
| 4,814,859 | 3/1989 | Kimura | 358/28 |

FOREIGN PATENT DOCUMENTS 3640651 11/1986 Fed. Rep. of Germany .

Primary Examiner—Tommy P. Chin
Attorney, Agent, or Firm—Armstrong, Nikaido, Marmelstein, Kubovcik & Murray

[57] ABSTRACT

A chrominance signal constituting a color image is modulated to generate a modulated chrominance signal. A phase difference between this modulated chrominance signal and a signal corresponding to a particular color is detected. The saturation of the chrominance signal where the phase difference is small is enhanced, thereby making it possible to readily discern a portion of a particular hue from a surrounding portion having a hue different from that hue.

23 Claims, 17 Drawing Sheets

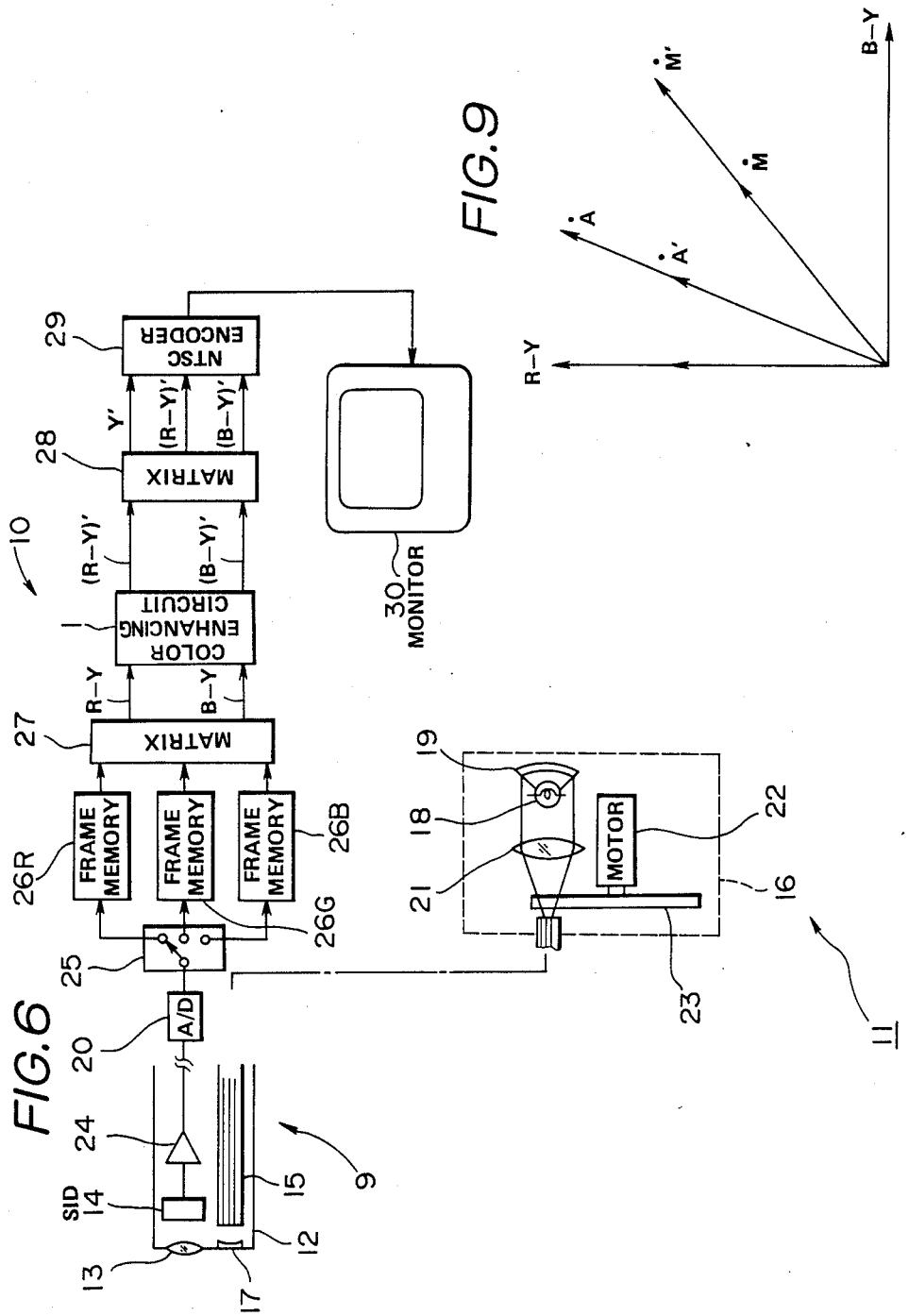

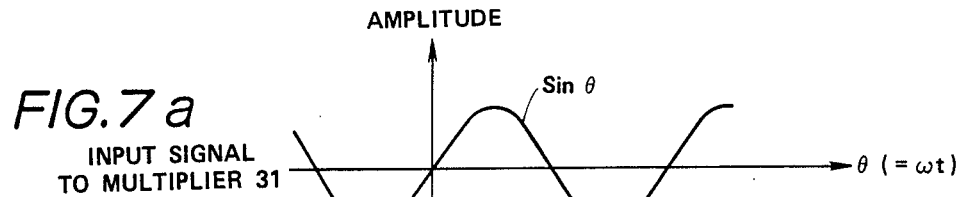
FIG. 7a INPUT SIGNAL TO MULTIPLIER 31
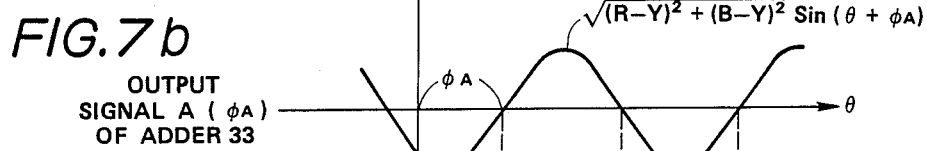
FIG. 7b OUTPUT SIGNAL A ($\phi_A$) OF ADDER 33
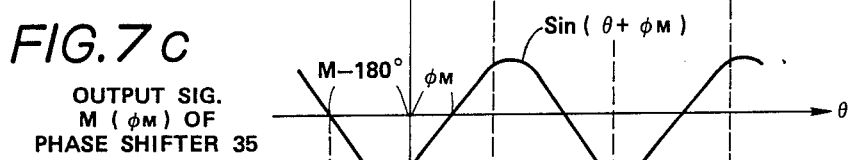
FIG. 7c OUTPUT SIG. M ($\phi_M$) OF PHASE SHIFTER 35
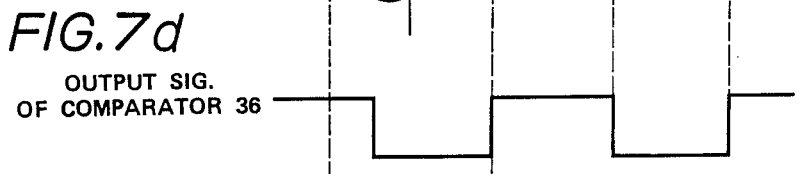
FIG. 7d OUTPUT SIG. OF COMPARATOR 36
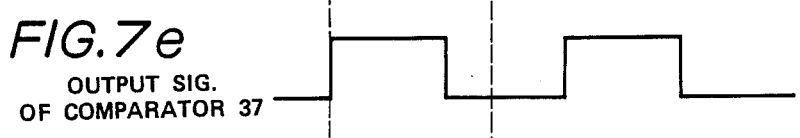
FIG. 7e OUTPUT SIG. OF COMPARATOR 37
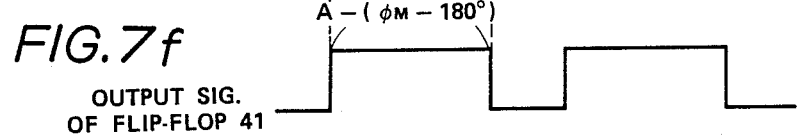
FIG. 7f OUTPUT SIG. OF FLIP-FLOP 41

FIG. 8a
UPPER AND LOWER THRESH LEVEL UL, LL OF WINDOW COMPARATOR 43
FIG. 8b
OUTPUT OF WINDOW COMP. 43
FIG. 8c
OUTPUT OF ADDER 46
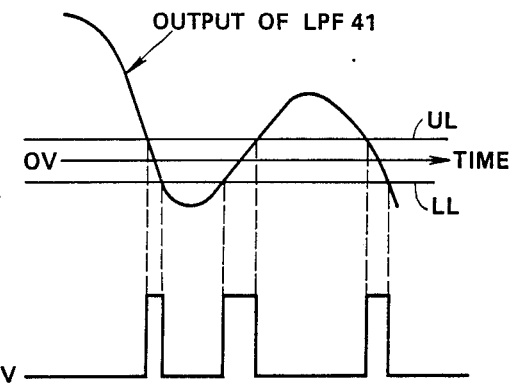
FIG. 10
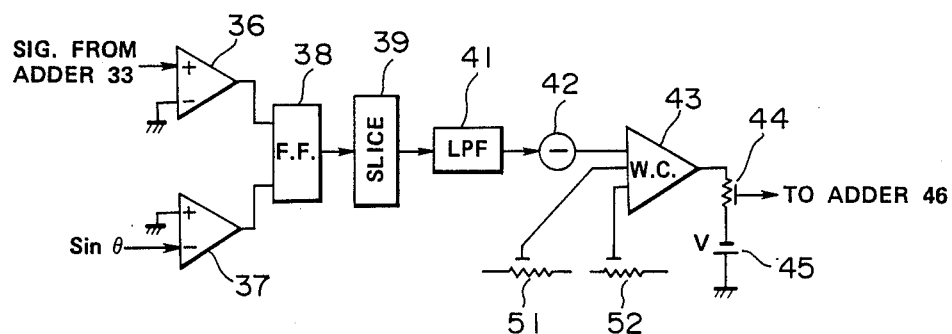

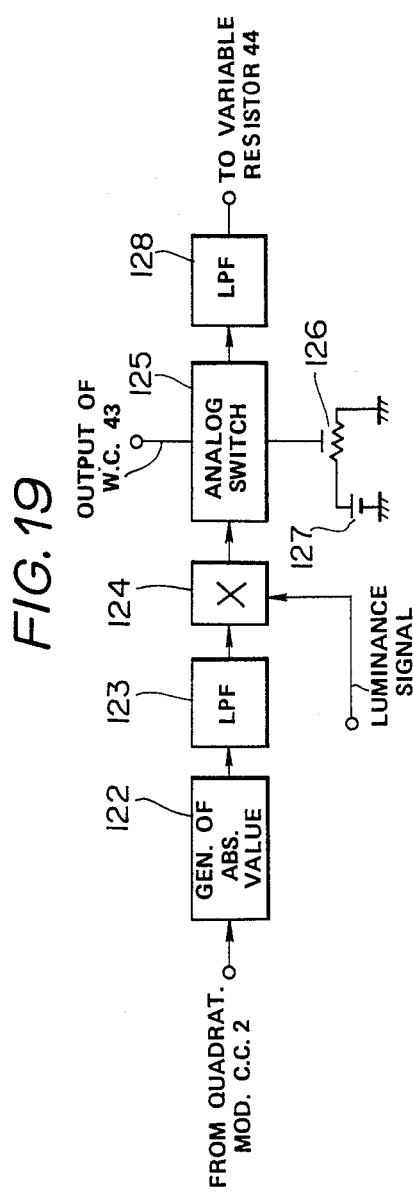
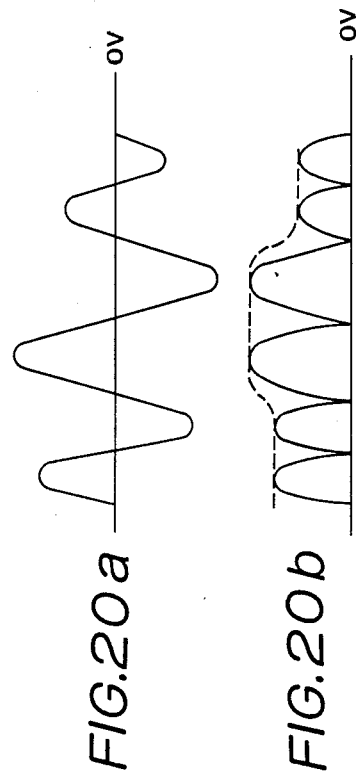
FIG. 19
FIG. 20a
FIG. 20b

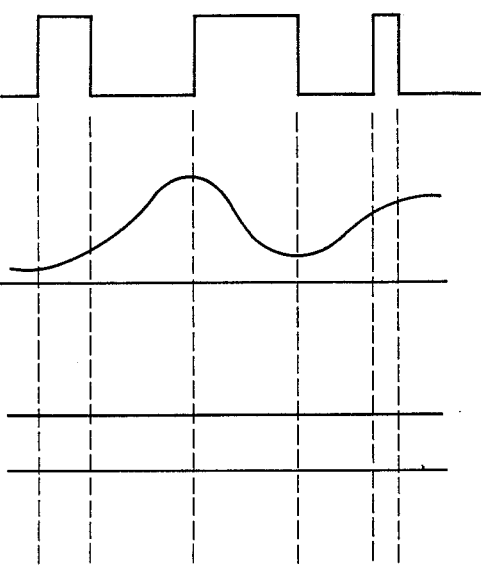
FIG.21a OUTPUT OF WINDOW COMP. 43
FIG.21b OUTPUT OF MULTIPLIER 24
FIG.21c OUTPUT OF VARIABLE RESISTOR 126
FIG.21d OUTPUT OF ANALOG SWITCH 125

COLOR ENHANCING CIRCUIT FOR ENHANCING SATURATION

FIELD OF THE INVENTION AND RELATED ART STATEMENT

The present invention relates to a color enhancing circuit provided with a means for enhancing saturation.

In recent years, television cameras using solid-state image sensing devices, such as CCDs, as image forming means have been used extensively, and they have also come to be used in endoscopes and the like.

If the aforementioned image forming means is used, there is an advantage in that, since electric signals are used, it is easy to make a feature more distinct by effecting signal processing For instance, the image picture of an endoscope could be reddish and tend to be concentrated within a narrow range in the hue plane, so that it would be advantageous if the picture could be made distinguishable For this reason, a color enhancing circuit for enhancing color tones is available.

As the above-described color enhancing circuit, there are a hue and saturation enhancement type of circuit and a hue enhancement type of circuit.

In the hue and color enhancement type of circuit, as shown in FIG. 1, the range of hue is expanded radially from a color vector M̄ of the average color acting as a center, while, in the hue enhancement type of circuit, hues are expanded from a color vector M̄ of the average color acting as a center, as shown in FIG. 2.

An endoscopic picture, for instance, is concentrated in the red region, as shown in FIG. 3, and, in this state, it is difficult to distinguish a blood vessel from other parts, or an affected part from other parts.

A color enhancing circuit of the above-described hue enhancement type is used to enhance hues in order to make small color differences noticeable. On the other hand, in a color enhancing circuit of the hue and saturation enhancement type, both hues and saturations are enhanced to make normal parts and affected parts distinguishable.

However, in a hue enhancement type of circuit, there is a possibility that, depending on how hues are expanded, peripheral colors may conversely be more noticeable than the color which was intended to be made distinct, or it may become impossible to make that color distinct. A similar situation can occur in the hue and saturation enhancement type as well. For instance, there is a possibility that it becomes easier to distinguish a normal part from an affected part if they are enhanced by saturation alone.

OBJECTS AND SUMMARY OF THE INVENTION

The object of the present invention is to provide a color enhancing ciructit which is capable of enhancing saturation.

Another object of the present invention is to provide a color enhancing circuit which is capable of making a portion having a hue slightly different from those of its surroundings distinct, and making that portion easily discernable.

Still another object of the present invention is to provide a color enhancing circuit which, during diagnosis, is capable of making an affected part readily distinguishable from an unaffected part.

As shown in FIG. 4, a color enhancing circuit 1 comprises a quadrature modulation circuit 2 for effecting quadrature modulation by multiplying a signal with a sine wave or a cosine wave, a designating (pointing) circuit 3 for enhancing color for outputting a hue which is desired to be enhanced, a hue difference detecting circuit 4 for detecting a signal which has undergone quadrature modulation and for detecting a phase difference with respect to a color to be enhanced, a saturation enhancing circuit 5 for enhancing the saturation of hue components which are desired to be enhanced, with respect to input color difference signals R-Y, B-Y by means of the output of the hue difference detecting circuit 4, thereby making it possible to output from the saturation enhancing circuit 5 saturation-enhanced color difference signals (R-Y)', (B-Y)' in the hue portion which is desired to be enhanced.

BRIEF DESCRIPTION OF THE DRAWINGS

FIGS. 4 to 9 relate to a first embodiment of the present invention, in which

FIG. 4 is a schematic diagram of a basic principle of the present invention;

FIG. 5 is a block diagram illustrating a specific example of the first embodiment;

FIG. 6 is a diagram schematically illustrating an electronic endoscope provided with the first embodiment;

FIGS. 7(a) to 7(f) are timing charts of waveforms illustrating the operation of the first embodiment;

FIGS. 8(a) to 8(c) are timing charts of waveforms illustrating the operation of a window comparator;

FIG. 9 is a diagram illustrating saturation enhancement in accordance with the first embodiment using color vector coordinates;

FIG. 10 is a block diagram of an essential section of a second embodiment of the present invention;

FIG. 19 is a block diagram illustrating major portions of a sixth embodiment of the present invention;

FIG. 20(a) to 20(b) are diagrams illustrating the operation of an absolute value circuit in accordance with the sixth embodiment;

FIGS. 21(a) to 21(d) are timing charts illustrating the operation in accordance with the sixth embodiment;

DETAILED DESCRIPTION OF THE PREFERRED EMBODIMENTS

Figure 1:
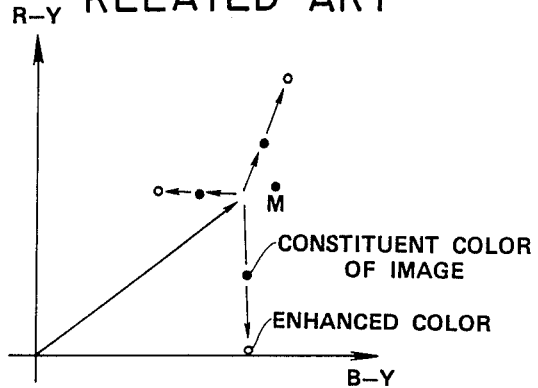
FIG. 1 is a diagram illustrating an operation using a color enhancing means of a hue and saturation enhancement type in an example of related art.
Figure 2:
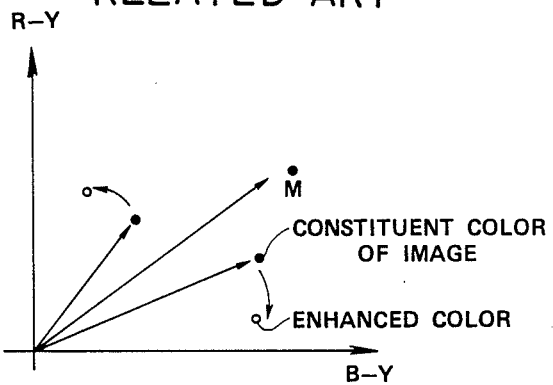
FIG. 2 is a diagram illustrating an operation using a color enhancing means of a hue enhancement type in an example of related art.
Figure 3:
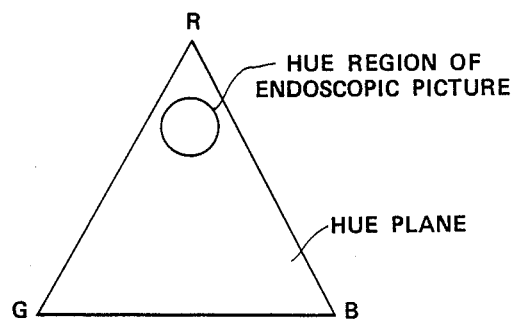
FIG. 3 is a diagram illustrating a range of hue of an endoscopic picture.
Figure 4:
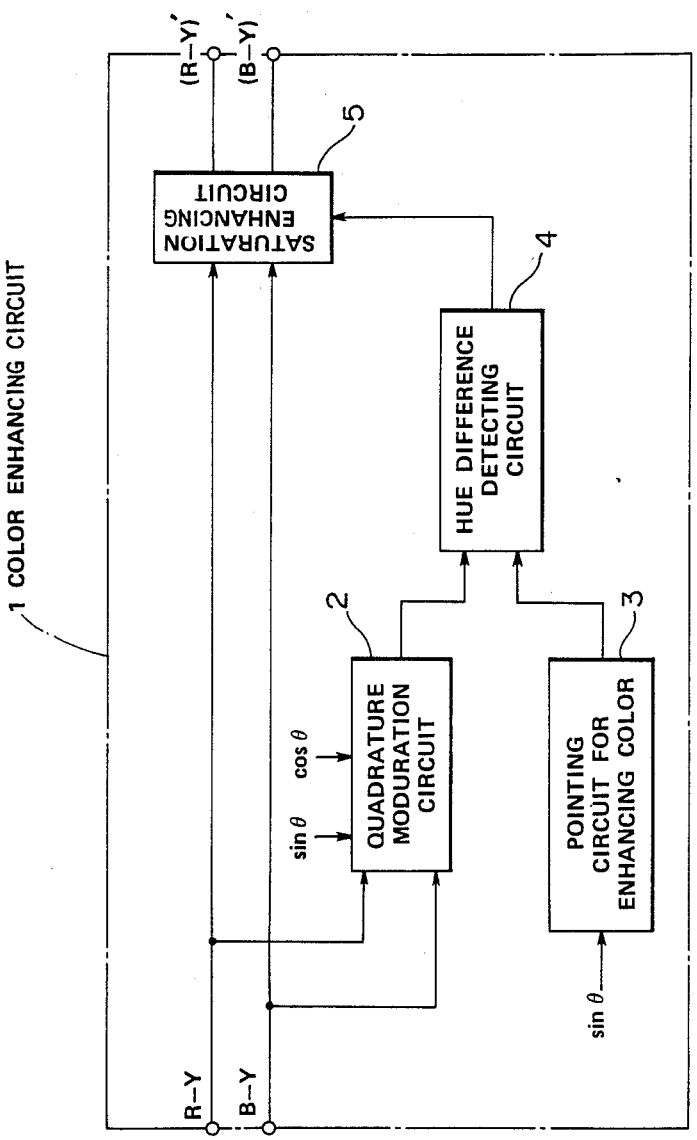

As shown in FIG. 6, an electronic endoscope apparatus 11 provided with a color enhancing circuit 1 in accordance with a first embodiment comprises an electronic endoscope 9 having an image forming means, a signal processor 10 for processing signals supplied to the electronic endoscope 9, a light source device 16 for supplying illumination light to the electronic endoscope 9, and a monitor 30 for displaying a color image of an object by means of video signals output from the signal processor 10.

In the electronic endoscope 9, an image forming lens 13 is disposed at the tip of an elongated insertion section 12 which is adapted to be inserted into a somatic cavity or the like. In the focal plane of the image forming lens 13, a solid-state image sensing device 14 such as a CCD is arranged as an image forming means. Light guide fibers 15 are passed through the insertion section 12 to transmit light from the external light source device 16 to the end of the insertion section 12 so that the object can be irradiated with illumination light through a lens 17.

In the light source device 16, light from a light source lamp 18 is reflected by a concave mirror 19, and is condensed through a condenser lens 21 at an incident end of a light guide cable through which the light guide fibers 15 are inserted. The condensed light is passed through a rotary filter 23 which is provided with three primary color transmitting filters around a rotational shaft and which is rotated by a motor 22, so that the object can be illuminated in sequence by light having wavelengths corresponding to the three primary colors. Therefore, the object is illuminated in sequence by illumination light of the three primary colors.

Video signals of an optical image photoelectrically transduced by the solid-state image sensing element 14 are amplified by a low noise factor preamplifier 24 and are then transmited to an A/D converter 20 inside the signal processor 10 through a signal cable. The video signals are transduced into digital signals by the A/D converter 20, and these digital signals are stored in sequence for each frame in frame memories 26R, 26G, and 26B, one for each of the three colors, via a multiplexer 25. After the signals are stored for each frame in the frame memories 26R, 26G, and 26B, these signals are read out simultaneously and are then converted into analog chrominance signals by a D/A converter (not shown) to provide two color difference signals R-Y, B-Y through a matrix circuit 27.

The color difference signals R-Y, B-Y are input to the color enhancing circuit 1 of the first embodiment. This color enhancing circuit 1 outputs color difference signals (R-Y)', (B-Y)' in which the saturation corresponding to the desired hue is enhanced. When these color difference signals (R-Y)', (B-Y)' pass through a luminance generating matrix circuit 28, a luminance signal Y' and the color difference signals (R-Y)', (B-Y)' are generated and input to an NTSC encoder 29. In this way, composite video signals are generated, and a color image is displayed on the color monitor 30.

Figure 5:
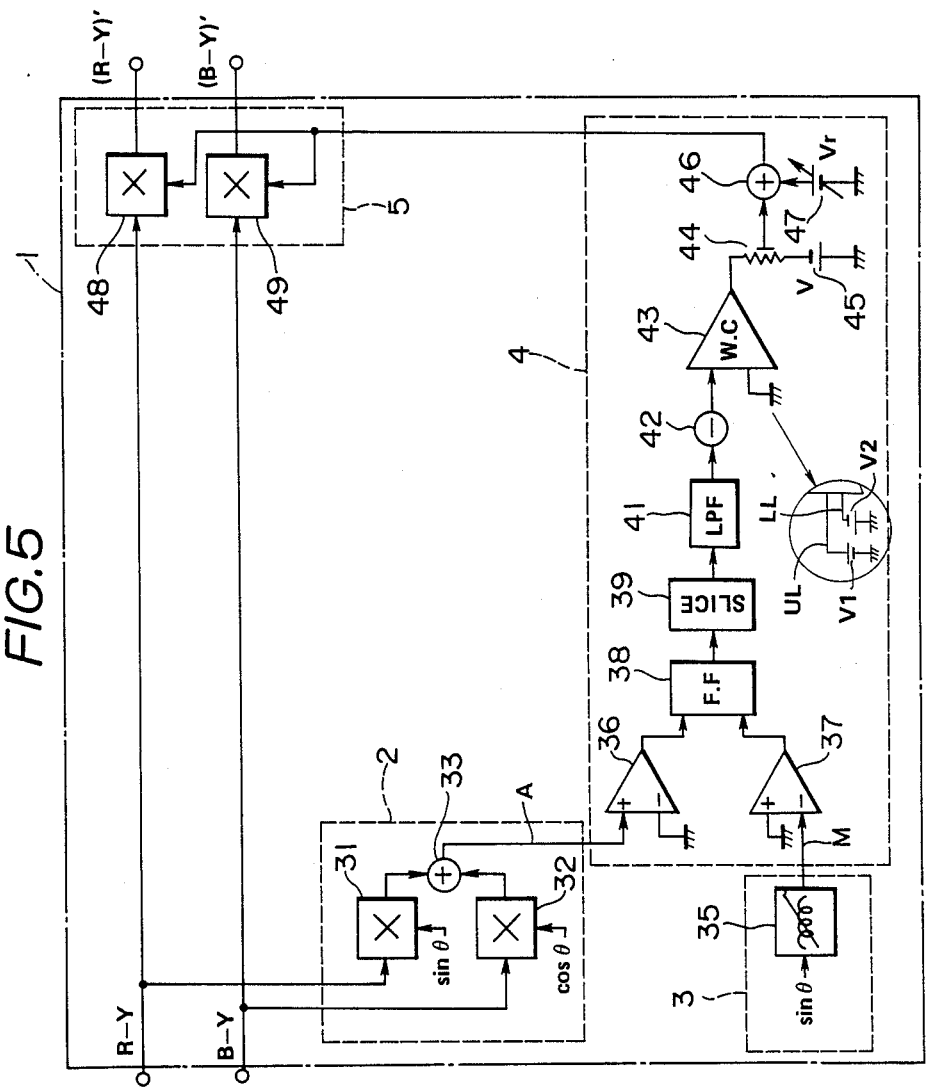

The signals R-Y, B-Y input to the color enhancing circuit 1 are input to a quadrature modulation circuit 2 and a saturation enhancing circuit 5, as shown in FIG. 5.

The color difference signals R-Y, B-Y input to the quadrature modulation circuit 2 are respectively multiplied by $\sin\theta$, $\cos\theta$ by multipliers 31, 32 and are then added by an adder 33 which outputs a quadrature phase modulation signal A ($\phi_A$). In this case, when the 3.58-MHz signal adopted for the NTSC encoder 29 is available as $\sin\theta$ and $\cos\theta$, it is possible to advantageously use a conventional circuit. The output signal A ($\phi_A$) of the adder 35 becomes $\sqrt{(R-Y)^2 + (B-Y)^2} \sin(\theta + \phi_A)$, as shown in FIG. 7(b) in relation to the $\sin\theta$ signal shown in FIG. 7(a), where the phase angle $\phi_A$ is $\tan^{-1}(R-Y)/(B-Y)$.

Meanwhile, the designating circuit 3 for enhancing color is constituted by a phase shifter 35 which is capable of changing the phase of the signal $\sin\theta$ used in the above-described modulation, and which outputs a hue signal M ($\phi_M$), i.e., $\sin(\theta + \phi_M)$. This output waveform is shown in FIG. 7c. The phase shifter 35 makes it possible to change the value of the phase $\phi_M$ (this value corresponds to a color).

The output signal A of the quadrature modulation circuit 2 and the output signal M of the phase shifter 35 are respectively input to comparators 36, 37 which constitute a hue difference detecting circuit 4, and signals obtained after comparisons with a zero potential are ouput therefrom. The output signal A is applied to a non-inverting input terminal of the comparator 36, which in turn outputs a signal of the waveform shown in FIG. 7d. Meanwhile, the output signal M of the phase shifter 35 (i.e., a modulated signal of the designated color which is desired to be enhanced) is applied to an inverting input terminal of the comparator 37, which in turn outputs a signal of the waveform shown in FIG. 7c. The reason why an inverted output is used in this comparator 36 is because a phase difference is determined within the range of $-180°$ to $+180°$.

The output of the comparator 37 is applied to a set terminal of a flip-flop 38 to set the output of the flip-flop 38 to high when the signal rises. Meanwhile, the output of the comparator 36 is applied to a reset terminal of the flip-flop 38 to set the output of the flip-flop 38 to low when the signal rises. The output of the flip-flop 38 has a rectangular waveform with a pulse width corresponding to $\phi_A - (\phi_M - 180°)$, as shown in FIG. 7f. This output is sliced at a constant amplitude and is then converted into a voltage signal having pulses proportional to $\phi_A - (\phi_M - 180°)$ by a low-pass filter 41. The reason why the output is sliced by the slice circuit 39 to have a constant amplitude is because such a slice circuit can simply be formed by a differential amplifer, and a circuit that is stable with respect to temperature can be obtained thereby. Since $\phi_A - (\phi_M - 180°)$ is $\phi_A - \phi_M + 180°$, a dc voltage corresponding to 180° is subtracted by a subtractor 42 to provide a voltage corresponding to $\phi_A - \phi_M$, i.e., a hue difference between two chrominance signals. The output of this subtractor 42 is input to a window comparator 43 in which processing shown in FIG. 8 is effected.

In other words, reference levels UL, LL for comparison are set in the vicinity of a zero level with respect to the output $\phi_A - \phi_M$ of the low-pass filter 41 through the subtractor 42, and, if the value of $\phi_A - \phi_M$ is within that range, the window comparator 43 outputs a pulse as shown in FIG. 8b. This pulse is divided by a variable resistor 44, a voltage V of a voltage source 45 is added to it, and a voltage Vr of a variable voltage source 47 is further added to it by an adder 46 to adjust the dc level of the signal. The signal thus obtained is input to multipliers 48, 49 which form the saturation enhancing circuit 5.

The signal input to the multipliers 48, 49 is multiplied by the color difference signals R-Y, B-Y, respectively, and the color difference signals (R-Y)', (B-Y)' in which saturation has been enhanced are output from this saturation enhancing circuit 5.

The output of the aforementioned adder 46 is shown in FIG. 8c. When there is no difference in hue from the color to be enhanced, the saturation is enhanced by multiplying that output by a voltage of 1V or more by the multipliers 48, 49. On the other hand, when there is a difference in hue from the color to be enhanced, saturation is reduced by multiplying the output by a voltage of 1V or less. Although a pulse is used as the signal multiplied by the multipliers 48, 49 in this case, it is possible to use a shape of a normal distribution by cutting off high-frequency components of the waveform by a low-pass filter or the like, or another shape. With regard to the choice of waveform, alot depends on experience.

It is possible to vary the magnitude of the multiplicand when saturation is enhanced by the multipliers 48, 49, thereby making it possible to vary the amount of enhancement of saturation.

For instance, if the voltage Vr of the variable voltage source 47 is increased, the value of the crest of the output of the adder 46 rises, as shown by the dot-dash line in FIG. 8c. Accordingly, chrominance signals (for forming a color image) that are close to chrominance signals corresponding to a designated color—in this case, the color difference signals R-Y, B-Y—are multiplied by larger factors, so that saturation is enhanced to a greater degree. It is possible to arrange the voltage source 45 and the variable voltage source 47 in series, and the adder 46 can be omitted. Furthermore, the voltage source 45 can be omitted and the variable voltage source 47 alone can be used, to simplify the arrangement.

This color enhancing circuit 1 makes it possible to enhance the saturation of a given color and decrease the saturation of the other colors, and is therefore capable of effecting color enhancement in such a manner that a particular color is made distinct to enable easy recognition thereof.

When the above-described color enhancing circuit 1 is used, using the color vector coordinates in FIG. 9 expressed by the color difference signals R-Y, B-Y obtained by subjecting R, G, and B chrominance signals to, for instance, matrix conversion, the color vector of a color which is to be made distinct is assumed to be $\vec{M}$, and one of the color vectors constituting an image is assumed to be $\vec{A}$. Since a chrominance signal in the vicinity of the color vector $\vec{M}$ is made to pass through the color enhancing circuit 1, the saturation of this chrominance signal is enhanced and becomes like $\vec{M}$. However, the color vector $\vec{A}$ with a hue difference which is offset from this color vector $\vec{M}$ undergoes a reduction in saturation and becomes like $\vec{A}$. Through this operation, it is possible to enhance a portion of the image in the vicinity of the color vector $\vec{M}$ of the color to be made distinct. Accordingly, if, for instance, the hue which is closer to that of an affected part in a somatic cavity than the hue of an unaffected part, is set as the color vector M of the color to be made distinct, in the event that an affected part or the like whose hue is slightly offset from the hue of an unaffected part exists, it is possible to bring that affected part into relief.

It should be noted that, in the above-described first embodiment, with respect to a color with a hue which is offset from that of a specific color, its saturation is reduced, but an arrangement may be alternately provided such that its saturation is not changed.

If the voltages V1, V2 applied to the window comparator 43 shown in FIG. 5 are made variable, it is possible to vary a hue width (a width of saturation to be enhanced) centering on a particular hue to be enhanced.

FIG. 10 illustrates an essential section of a second embodiment in accordance with the present invention.

In this second embodiment, the phase shifter 35 of the first embodiment is not used, but a similar function is realized. A sine wave is directly input to the inverting input terminal of the comparator 37, and the output of the subtractor 42 becomes a signal which has a voltage obtained by subjecting a chrominance signal constituting the image to quadrature modulation. In the window comparator 43, the range to be discriminated is made variable by a variable resistor 51 with respect to that signal, and a mean value of the range to be discriminated is made variable by a variable resistor 52. In other words, the width of the saturation to be enhanced can be made variable by the variable resistor 51, while the average hue for which saturation enhancement is effected can be made variable by the variable resistor 52. The operation of the window comparator 43 is the same as that shown in FIG. 8. As for the output of the variable resistor 44, the same signal as that of the first embodiment is obtained.

In this second embodiment, since the phase shifter 35 becomes unnecessary, it is possible to realize a similar function without using components of a special circuit configuration and to reduce the costs.

Figure 11:
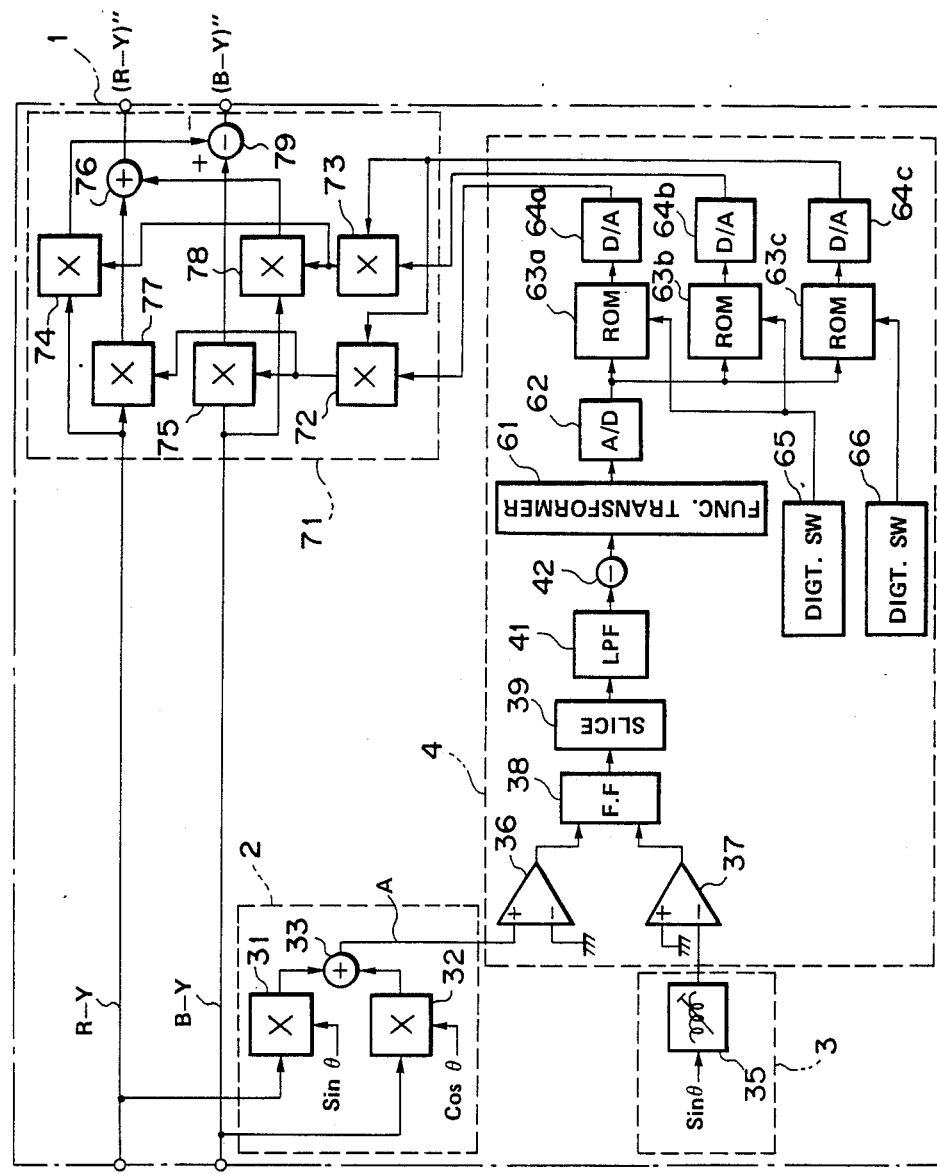
FIG. 11 is a block diagram of a third embodiment of the present invention.

FIG. 11 shows a third embodiment of the present invention.

This third embodiment is arranged such as to allow both the hue and saturation to be enhanced independently and simultaneously.

Figure 12:
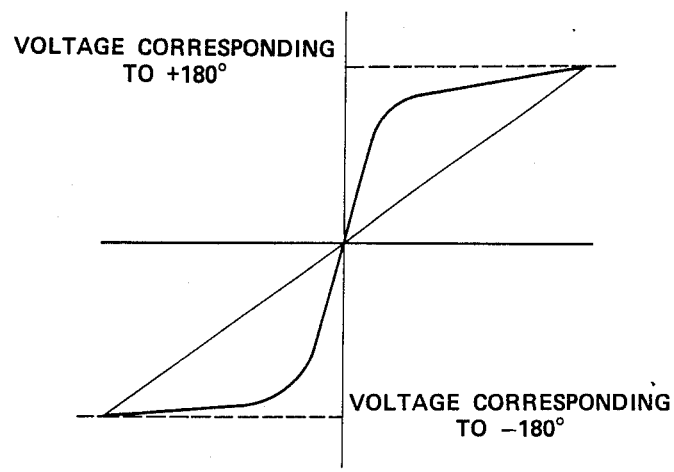
FIG. 12 is a characteristic diagram illustrating input and output characteristics of a function transformer in accordance with the third embodiment.

The configuration and operation of components leading to the subtractor 42 are the same as those of the first embodiment. A signal having a potential difference corresponding to $\phi_A - \phi_M$, which is an output of the subtractor 42, is introduced to a function transformer 61. The output of the function transformer 61 is converted into a digital signal by an A/D converter 62. As shown in FIG. 12, the function transformer 61 serves to limit the input voltage so as not to exceed ±180°, thereby making the units of quantitization to finer units in the vicinity of a level in which $\phi_A - \phi_M=0$. The output of the A/D converter 62 is supplied to three ROMs 63a, 63b, and 63c. Functions stored in these ROMs 63a, 63b, and 63c on the basis of conversion formula (1) expressed below. In addition, the compensation effected by the function transformer 61 is restored in the ROMS 63a, 63b, and 63c.

$$\begin{pmatrix}(B-Y)''\\(R-Y)''\end{pmatrix} = K \cdot \begin{pmatrix}\cos\alpha & -\sin\alpha\\\sin\alpha & +\cos\alpha\end{pmatrix}\begin{pmatrix}B-Y\\R-Y\end{pmatrix} \qquad (1)$$

$$= \begin{pmatrix}K\cdot\cos\alpha\,(B-Y) - K\cdot\sin\alpha\,(R-Y)\\K\cdot\sin\alpha\,(B-Y) + K\cdot\cos\alpha\,(R-Y)\end{pmatrix}$$

where $\cos\alpha$ and $\sin\alpha$ form matrices for rotatably moving the vectors to enhance the hue, an angle $\alpha$ expresses the magnitude (rotational angle) of hue enhancement to be effected, while K corresponds to a coefficient expressing the magnitude of saturation enhancement to be effected. Since the output of the A/D converter 62 is a digital amount corresponding to a color difference $\alpha$, the amount of $\cos\alpha$ corresponding to the hue difference $\alpha$ is stored in advance in the ROM 63a, and an analog amount of $\cos\alpha$ is output via a D/A converter 64a. The function of $\sin\alpha$ is similarly stored in the ROM 63b, and the value of sin with respect to $\alpha$ is output via a D/A converter 64b. In addition, a digital switch 65 is used to make the addresses of the ROMS 63a and 63b variable and vary digital of $\sin\alpha$ and $\cos\alpha$ that are output. In other words, the amount of rotational movement is adjusted by the digital switch 65. A digital amount corresponding to K is stored in the ROM 63c. The waveform of K can be freely set since a ROM is used. The output of the ROM 63c is converted into an analog amount by a D/A converter 64c. A digital switch 66 is used to adjust the output value of K by varying the address of the ROM 63c in the same way as the amount of rotational movement.

The outputs of the D/A converters 64a, 64b, and 64c which form a hue difference detecting circuit 4' are input to multipliers 72, 73 which form a saturation and hue enhancing circuit 71 The values of $\cos\alpha$ and K as well as sin and K are respective multiplied, and a calculation of the formula (R-Y)''=K. sin $\alpha$(B-Y)+K. cos $\alpha$(R-Y) is performed by multipliers 74, 75 and an adder 76 so as to output the color difference signal (R-Y)'' in which the saturation and the hue are enhanced. Similarly, a calculation of the formula (B-Y)''=K. cos $\alpha$(B-Y)-K . sin $\alpha$(R-Y) is performed by multipliers 77, 78 and a multiplier 79 so as to output the color difference signal (B-Y)'' in which the saturation and the hue are enhanced.

In accordance with this third embodiment, since the hue enhancement and the saturation enhancement can be realized by different systems, during observation it is possible to change over between an image in which image processing is performed only with respect to the hue enhancement and an image in which image processing is performed only with respect to the saturation enhancement. In addition, it is possible to widen the width of the selection for making a feature portion distinct through the combined use thereof.

Accordingly, the application of this embodiment will prove very effective where diagnosis is effected using an endoscopic picture.

Although, in the foregoing embodiments, the color for which the saturation enhancement is performed is present only at one portion adjacent to a certain color, if an arrangement is provided such that, for instance, a plurality of window comparators 43 are provided in parallel in FIG. 10 and their outputs are added to effect outputting, it is possible to enhance the saturation at a plurality of hue portions.

In addition, when displaying a color enhanced image on a color monitor, it is possible to transduce the color-enhanced color difference signals (R-Y)' and (B-Y)' as well as (R-Y)'' and (B-Y)'' into the three primary color signals of R, G, and B by allowing them to pass through a inverse matrix circuit.

It is also possible to effect color enhancement in units of a plurality of picture elements.

Figure 13:
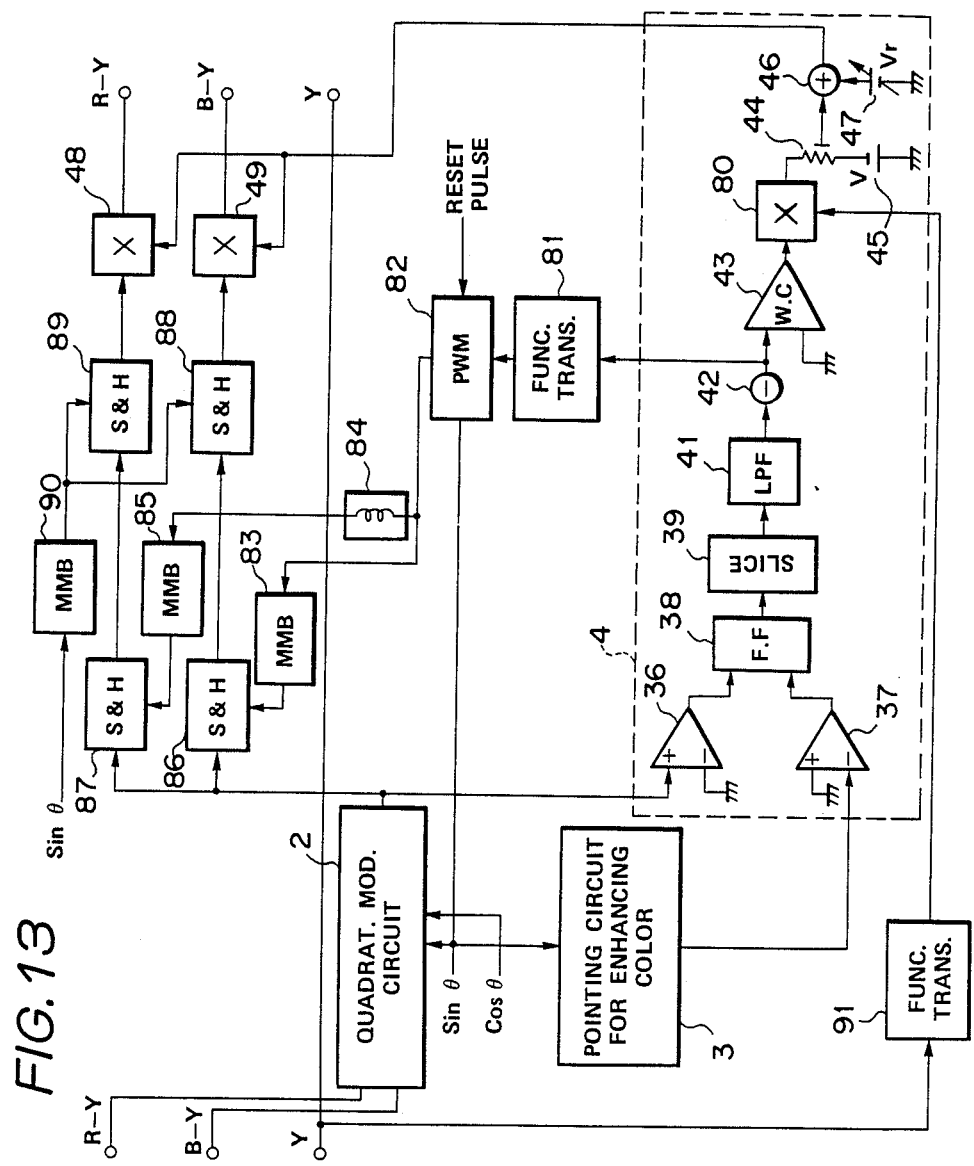
FIG. 13 is a block diagram illustrating the configuration of a fourth embodiment of the present invention.

FIG. 13 shows a fourth embodiment of the present invention.

In the same way as the above-described third embodiment, this fourth embodiment is so configured as to be provided with both the saturation enhancing function and the hue enhancing function and is arranged with entirely analog circuits without using an A/D converter, making it possible to obtain a similar effect.

This embodiment is identical with the first embodiment up to the quadrature modulation circuit 2, the circuit 3 for designating a color to be enhanced, and the hue difference detecting circuit 4 except that a multiplier 80 is interposed between the window comparator 43 and the variable resistor 44 in the hue difference detecting circuit 4.

Figure 14:
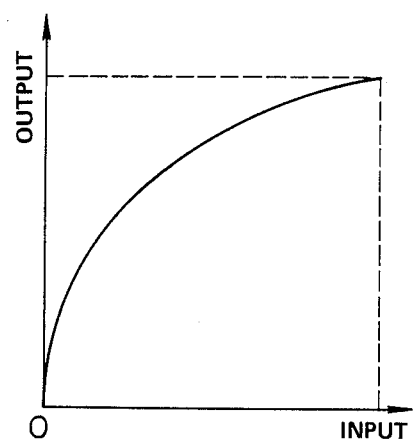
FIG. 14 is a characteristic diagram of the function transformer used in the fourth embodiment.

A phase difference signal which is the output of the subtractor 42 is introduced to a function transformer 81. In this function transformer 81, transformation is effected with respect to an input by using the characteristics shown in FIG. 14. This is to ensure that a pulse width will not be varied when the phase difference is −180°, 0°, and +180° in a pulse width modulation circuit (PWM) 82. By virtue of this operation, the phase of a color whose phase is shifted ±180° from a standard color does not change. In a pulse width modulation circuit 82, a sine wave is transformed into a rectangular wave to provide a reference wave, and the pulse width of its wave is varied by an input signal. The output of the pulse width modulation circuit 82 is input to a monostable multivibrator (MMB) 83, and is converted into a narrow strobe pulse for sample holding. In parallel with the same, the output of the pulse width modulation circuit 82 undergoes a delay corresponding to a phase angle of 90° by a delay line 84, and is similarly converted by the monostable vibrator 85 into a narrow strobe pulse whose phase is shifted 90° from that of the output of the monostable multivibrator 83. These pulses are respectively input into sample-hold circuits 86, 87 to sample-hold the output of the quadrature modulation circuit 2. The outputs of the sample-hold circuits 86, 87 are respectively input to sample-hold circuits 88, 89 to fix the sampling period, and sample holding is effected again. The sample pulses of the sample-hold circuits 88, 89 are created by a monostable multivibrator 90 which outputs pulses of a fixed phase from sine waves. The pulse width modulation circuit 82 is so arranged as to be reset by a reset pulse at the angular position of 0°.

By virtue of the above-described operation, signals in which the signals R-Y, B-Y are hue-enhanced are obtained.

Figure 15:
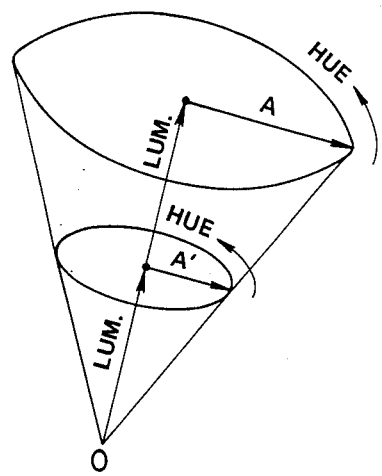
FIG. 15 is a diagram illustrating a function in accordance with the fourth embodiment.

The saturation enhancement is effected as follows: A luminance signal Y obtained through the matrix circuit 27 is subjected to function transformation, shown in FIG. 14, by a function transformer 91. The output of the window comparator 43 is multiplied by the output of the function transformer 91 through the multiplier 80. The voltage is then divided by the pulse variable resistor 44. A dc voltage is added to the output of the variable resistor 44 by the adder 46. The hue-enhanced signal is multiplied by the multipliers 48, 49. The reason for muliplying the output of the window comparator 43 by the luminance signal will be described below. Red, which is the hue on which an endoscopic picture concentrates most, is a color having a low degree of luminance. The relationship between the luminance and the hue where the degree of luminance is low is shown in FIG. 15, and the saturation corresponds to a radial value A. If red, having a low degree of luminance, is subjected to saturation enhancement and the saturation of red reaches a saturated level, the saturation becomes too noticeable, so that a difference in a structural change due to a difference in luminance becomes difficult to distinguish. The degree of saturation is determined by the saturation and a distance in the direction normal to the saturation, shown in FIG. 15, and, in the drawing, the distance in the nornal direction corresponds to A' and A. The values A and A' have different values of saturation depending on the luminance. Namely, in a portion of a low degree of luminance, the value of luminance is proportional to the value of saturation in the normal direction, so that the greater the luminance, the greater the saturated value of hue. The multiplication of the saturation enhancement signal with a component of luminance results in weakening the amount of saturation enhancement of a color having a low degree of luminance, thereby preventing the degree of saturation from becoming saturated. Furthermore, this effect is enhanced by selecting in the function transformer 91 appropriate gamma characteristics of the luminance to be multiplied with.

Figure 16:
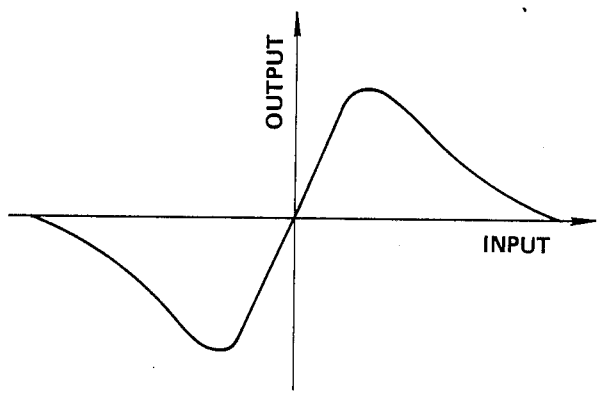
FIG. 16 is a characteristic diagram of the function transformer used in the fourth embodiment.

In the embodiment described above, the circuits becomes low in costs by using analog circuits for all the circuits. The amount of hue enhancement can be varied by varying the amplitude of the characteristics of the function transformer 81 shown in FIG. 16.

Figure 17:
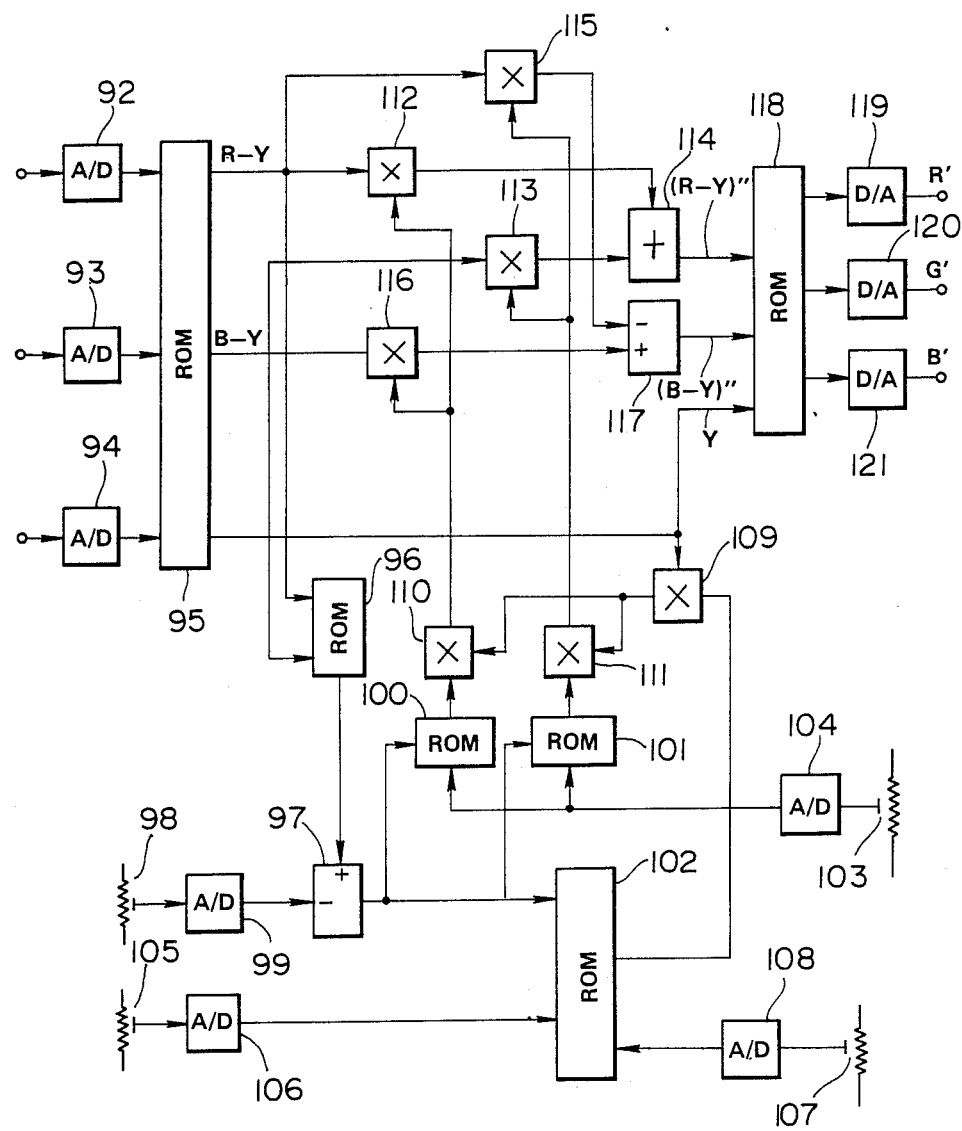
FIG. 17 is a block diagram illustrating the configuration of a fifth embodiment of the present invention.

FIG. 17 illustrates a fifth embodiment of the present invention.

In this embodiment, the above-described third and fourth embodiments are realized by using digital circuits for the entire circuits.

Figure 18:
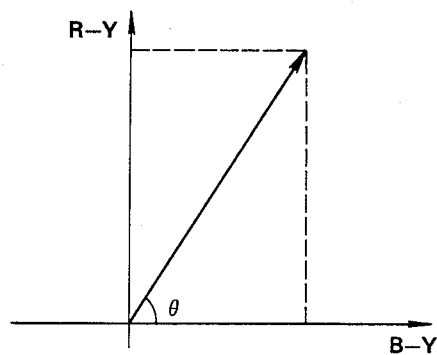
FIG. 18 is a diagram illustrating that phase signal data output from a ROM corresponds to an angle $\theta$ determined by R - Y, B - Y.

The respective chrominance signals of R, G, and B input are respectively converted from analog signals into digital signals by A/D converters 92, 93, and 94. The converted output signals are subjected to matrix conversion by a ROM 95 to be converted from R, G, and B signals into R-Y, B-Y, and Y signals. Upon input of the R-Y and B-Y signals, a ROM 96 outputs a phase signal. The phase signal is a digital amount corresponding to $\theta$ which is determined univalently by R-Y and B-Y, as shown in FIG. 18. The output of the ROM 96 is supplied to a subtractor 97. In the subtractor 97, an amount, in which a voltage level set arbitrarily by a variable resistor 98 is converted into a digital amount by an A/D converter 99, is subtracted from the phase signal. The subtractor 97 outputs a digital amount of a difference and has a circuit which outputs a sign bit to the most significant bit. In addition, as for its output, the subtractor 97 is arranged such as to output a digital amount in which a phase difference corresponds to $-180°$ to $+180°$, and as for a calculated value above $+180°$ or below $-180°$, a value in the range of $-180°$ to $+180°$ for the sake of calculation. For instance, when the phase difference is calculated to be $+230°$, $-130°$ is output. The voltage level set by the variable resistor 98 is made to correspond to the phase of the standard color.

The output of the subtractor 97 is input to ROMS 100, 101, and 102. The value of $\cos \alpha$ corresponding to a phase difference $\alpha$ is stored in the ROM 100, while the value of $\sin \alpha$ is similarly stored in the ROM 101, where the values of $\cos \alpha$ and $\sin \alpha$ are equivalent to those handled in Formula (1) and are used to rotatively shift R-Y and B-Y. Since a ROM is used, it is possible to weight the rotation freely. In addition, a variable resistor 103 designates a voltage level, and its value is subjected to A/D conversion by an A/D converter 104 to be input to the ROMS 100, 101. The voltage level set by the variable resistor 103 is made to correspond to an amount of rotational shift, i.e., an amount of hue enhancement.

Meanwhile, the ROM 102 outputs a saturation enhancement signal in the same way as the ROM 63c in FIG. 11. Since a ROM is used, an output waveform may be made rectangular in the same way as the output of the window comparator 43, or may be set in the state of a normal distribution, and can thus be set freely. The amount of saturation enhancement is varied by a variable resistor 105 and an A/D converter 106, and a phase width to be saturation-enhanced is made variable by a variable resistor 107 and an A/D converter 108 in the same way as the window width of the window comparator 43. The output of the ROM 102 is normalized by being multiplied by the luminance Y through a multiplier 109, and is then multiplied by $\cos \alpha$ and $\sin \alpha$ through multipliers 110, 111, respectively.

A phase shift with respect to R-Y shown in Formula (1) is performed by multipliers 112, 113 and an adder 114, while a phase shift with respect to B-Y is performed by multipliers 115, 116 and a subtractor 117 so as to obtain enhancement signals of (R-Y)'' and (B-Y)''. The signals (R-Y)'', (B-Y)'', and Y signals take inverse matrices in a ROM 118 to provide enhanced digital amounts of R', G', and B'. These digital amounts are then subjected to D/A conversion by D/A converters 119, 120, and 121, respectively, to obtain enhanced analog signals of R', G', and B'.

Although, in the above-described embodiment, the circuit become expensive since digital signal processing is effected, the S/N ratio ratio improves, and the required amount of adjustment of the circuits can be reduced. In addition, although the rotational shift is performed by multipliers, the rotational shift may be processed by a look-up table using a ROM.

FIG. 19 illustrates an essential section of a sixth embodiment of the present invention.

In the configuration of this embodiment, the elements shown in FIG. 19 are added to the configuration shown in FIG. 5.

The output of the quadrature modulation circuit 2 is supplied to an absolute value generator 122 to obtain an absolute value of a signal shown in FIG. 20a. The waveform is then rectified by a low-pass filter (LPF) 123 to obtain a waveform indicated by a dotted line in FIG. 10b, and this waveform becomes a saturation signal. This saturation signal is multiplied by a luminance signal through a multiplier 124 to be normalized with the luminance and the output is supplied to an analog switch 125. The analog switch 125 performs the operation shown in FIG. 21. The output of the window comparator 43 is shown in FIG. 21a. This wave is used to control the analog switch 125. This signal is used to effect control as to whether the output of the multiplier 124 is output or the output of the variable resistor 126 is output. The central level of saturation enhancement is set by a voltage source 127. The operation is effected in such a manner that, if the saturation signal level is lower than the output level of the varible resistor 126 within the range of the reference color, the saturation is reduced, and if it is higher, the saturation is enhanced. Through the above-described operation, the waveforms shown in FIGS. 21b, 21c are controlled with the output of the window comparator 43 shown in FIG. 21a, so as to obtain an output of the analog switch 125 shown in FIG. 21d. A low-pass filter (LPF) 128 outputs a signal band to the pulse variable resistor 44 in response to the color difference signal. The potential of the variable voltage source 47 and that of the variable resistor 126 are made identical.

Figure 22A:
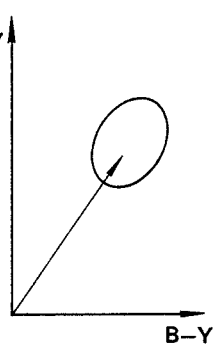
FIGS. 22(a) to 22(c) are diagrams illustrating the operation in accodance with the sixth embodiment.
Figure 22B:
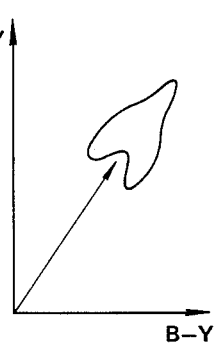
Figure 22C:
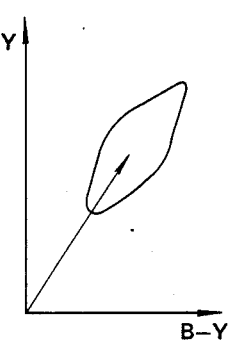

To describe the effect of the above-described sixth embodiment, the color distribution constituting a picture is shown in, for instance, in FIG. 22a, and if a reference color vector is taken as illustrated in the drawing, the color distribuion varies as shown in FIG. 22b if saturation enhancement is effected. It is possible to further expand the color distribution by expanding the distribution in the direction of the saturation, as shown in FIG. 22c.

Figure 23:
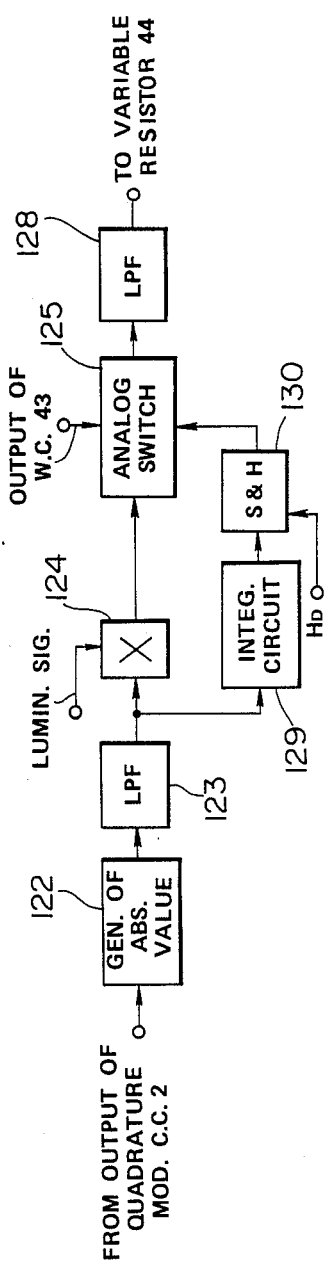
FIG. 23 is a block diagram illustrating major portions of a modification of the sixth embodiment.

FIG. 23 illustrates an essential section of a modification of the sixth embodiment in accordance with the present invention.

In this modification, the central level of the saturation signal is not set arbitrarily, but is obtained from the averaged saturation constituting the picture. The saturation signal is integrated for one horizontal scanning line by an integrator 129, and its output is sample-held by a sample-hold circuit 130 to be input to the analog switch 125. At this time, the potential of the variable voltage source 47 and that of the variable resistor 126 are made idential. As for a method of obtaining the averaged saturation, it is unnecessary to average a front line, and an arrangement may be provided such as to average a front field or a front frame on the basis of the operator's experience.

By virtue of this operation, it is possible to further expand the color distribution and to make the color difference distinct.

Figure 24:
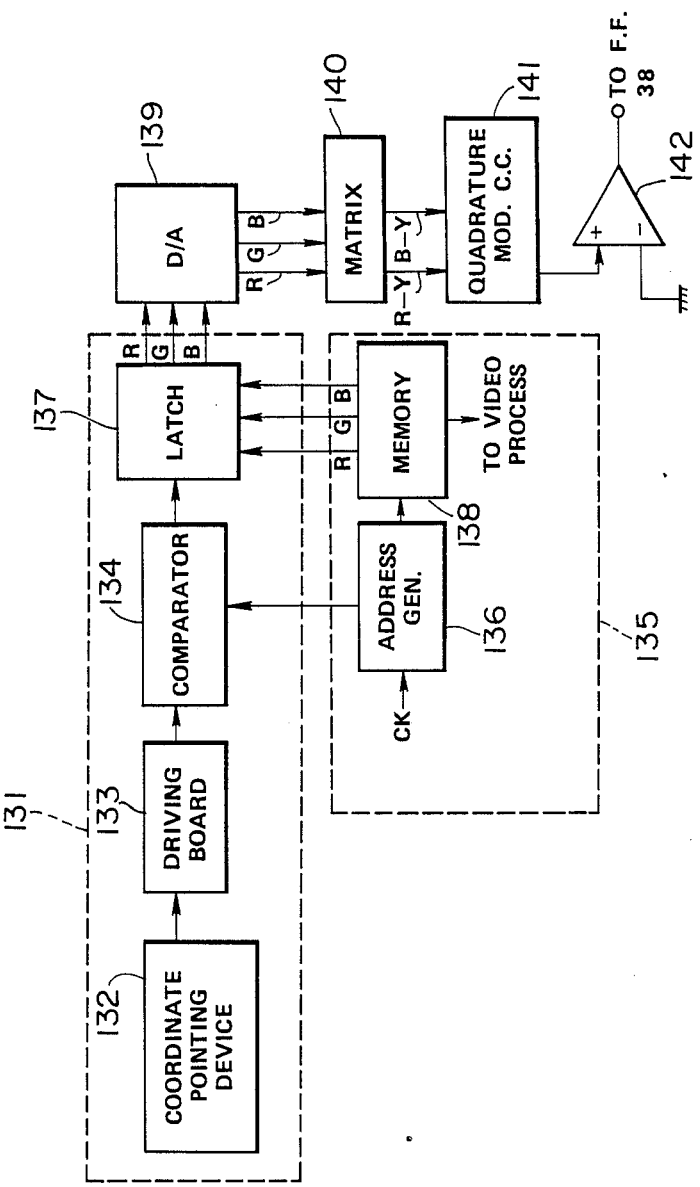
FIG. 24 is is a block diagram illustrating the configuration of a seventh embodiment of the present invention.

A seventh embodiment of the present invention is shown in FIG. 24.

In this embodiment, the circuit 3 for designating a color to be enhanced by means of the phase shifter 35 in, for instance, FIG. 6, and a coordinate designating device such a light pen or a mouse is used. The operator designates a color on a screen while looking at the picture, and that color is set as the reference color.

Coordinates where the color designated by a coordinate designating device 132 in a designated color detecting circuit 131 are supplied to a driving board 133. In the driving board 133, addresses that are sent serially are converted into a parallel form. The output of the driving board 133 is supplied to a comparator 134. The comparator 134 compares addresses sent from an address generating section 136 for a moment in a video processor 135 and from the coordinate designating device 132 and is arranged to output a pulse when the addresses are equivalent. A latch 137 operates such that date output from a memory 138 in the video processor 135 is sampled when a pulse is sent thereto from the comparator 134, and the data is held if the pulse is not sent thereto. The R, G, and B signals which are the outputs of the latch 137 are supplied to a D/A converter 139 to be converted into analog amounts, and are then converted into the color difference signals R-Y, B-Y by a matrix circuit 140. In a quadrature modulation circuit 141, an input color difference signal undergoes quadrature modulation, is compared with a zero voltage in a comparator 142, and is then applied to a reset terminal of the flip-flop 38. Through this operation, the color designated in the picture is made into the reference hue (designated hue).

Figure 25:
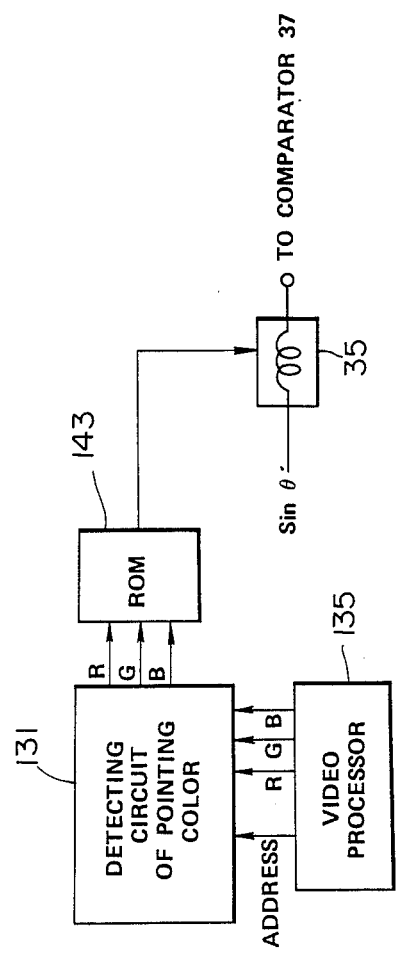
FIG. 25 is a block diagram illustrating the configuration of an eighth embodiment of the present invention.

FIG. 25 illustrates a major section of an eighth embodiment in accordance with the present invention.

The object of this embodiment is the same as that of the seventh embodiment, and this embodiment is provided with a different circuit configuration. The R, G, and B components of the color desginated as the reference color are determined and output by the designated color detecting circuit 131. Upon receipt of the outputs of R, G, and B components, a ROM 143 outputs a signal for controlling the phase shifter 35. This control signal is used to shift the phase of sin α to allow the same to be operated as the phase of the reference color.

The driving board 133 inside the video processor 135 operates such as to hold the address data until the next designation is performed after the reference color is designated in the picture.

As described above, in the seventh and eighth embodiments, the establishment of a reference color is effected by setting a position in the picture, so that there is an advantage in that the setting of the reference color is facilitated.

Figure 26:
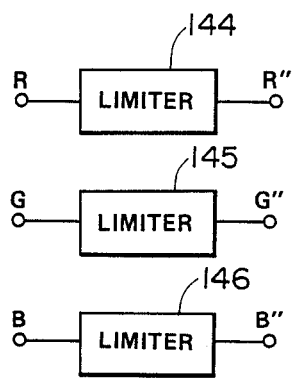
FIG. 26 is a block diagram illustrating the configuration of a ninth embodiment of the present invention.

FIG. 26 illustrates a ninth embodiment of the present invention.

This embodiment employs a circuit for limiting the color-enhanced R, G, B signals R', G', B'.

Figure 27:
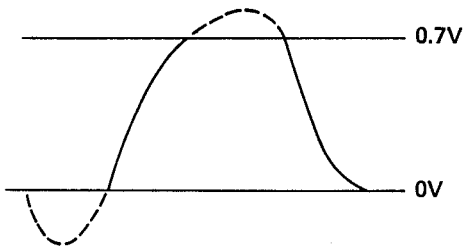
FIG. 27 is a diagram illustrating the function of each limiter circuit in accordance with the ninth embodiment.

The signals (R-Y)", (B-Y)" are obtained by performing hue enhancement and saturation enhancement, and are subjected to matrix conversion to obtain R', G', B' signals. R, G, B signals normally have an amplitude of 0V to 0.7Vp-p, and there is no signal of a negative voltage level. Depending on a method of enhancement, there are cases where any of the R', G', B' signals after undergoing matrix conversion exceeds 0.7V or displays a negative potential, as indicated by a dotted line in FIG. 27. To prevent the occurrence of this phenomenon, the R', G', B' signals are limited at 0V and 0.7V in limiter circuits 144, 145, 146, respectively, thereby obtaining output signals of R", G", B" that are limited at upper and lower limits. This operation makes it possible to eliminate a malfunctioning of an apparatus which receives the output of the color enhancing circuit.

Figure 28:
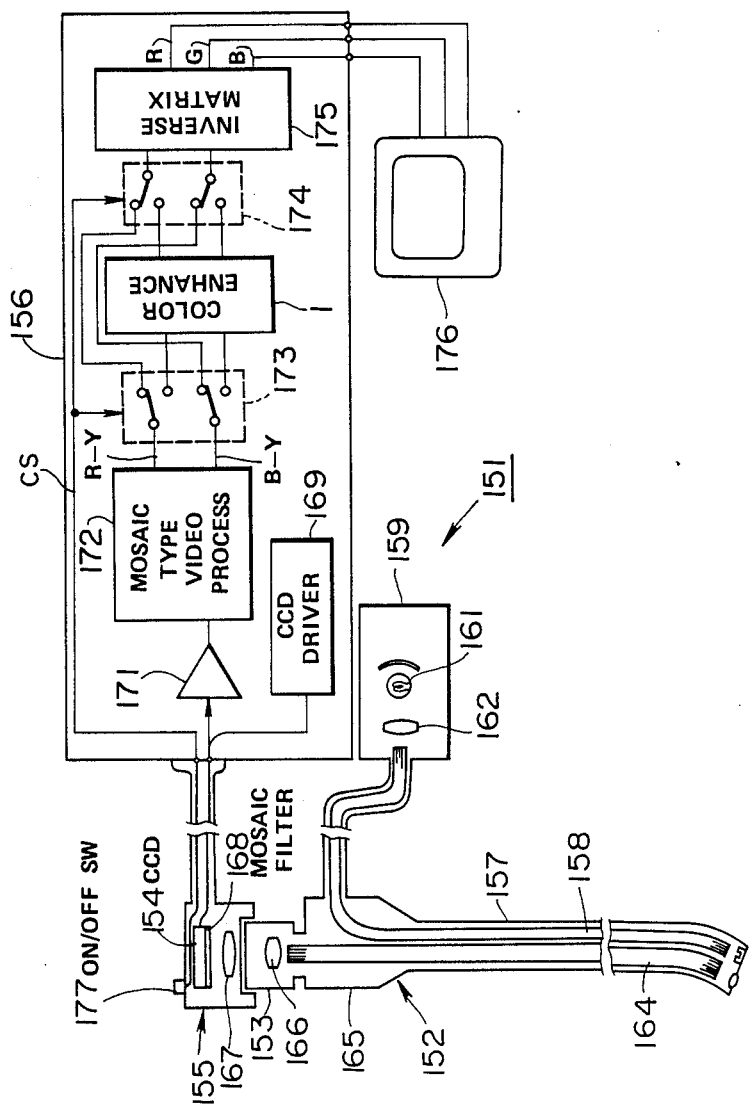
FIG. 28 is a schematic diagram of an endoscope apparatus to which the color enhancing circuit in accordance with the present invention is applied.

Although, in the first embodiment, an example is shown in which the present invention is applied to the signal processor 10 for the color image sensing means incorporated in the electronic endoscope 9, each of the embodiments of the present invention may similarly be applied to a signal processor 156 for a television camera 155 incorporating a solid-state image sensing device (SID) 154 such as a CCD in an eyepiece section 153 of of an optical endoscope 152 of an endoscope apparatus 151, as shown in FIG. 28.

In the optical endoscope 152, a light guide 158 for transmitting illumination light is inserted in an elongated insertion section 157. If an incident end of this light guide 158 is connected to a light source device 159, the white color light of a white color lamp 161 is condensed by a condenser lens 162 and is supplied to this incident end. An object is illuminated with this white-color illumination light transmitted by the light guide 158. Subsequently, an image of the illuminated object is formed at an incident end surface of an image guide 164 through an objective 163 installed at a tip portion of the insertion section 157. An optical image formed on this incident end surface is transmitted to an emergent end surface on the side of an operating section 165 or the eyepiece section 153 through the image guide 164, and can be visually observed through an eyepiece 166 disposed such as to face the emergent end surface. When the television camera 155 is mounted on this eyepiece section 153, an image is formed on an image sensing surface of the SID 154 through an image forming lens 167 disposed such as to face the eyepiece 166. A mosaic filter 168 is provided on this image sensing surface to effect color separation for each picture element.

An image signal photoelectrically transduced by the SID 154 is read upon application of a drive signal output from an SID driver 169, and, after it is amplified by an amplifier 171, the signal is input to a mosaic type video processing circuit 172, where the signal undergoes color separation and the color difference signals R-Y, B-Y are output. The color difference signals R-Y, B-Y are input to the color enhancing circuit 1 (e.g. that of the first embodiment) via a first changeover switch 173. The color difference signals (R-Y)', (B-Y)' which have been color-enhanced in the color enhancing circuit 1 are input to a inverse matrix circuit 175 via a second changeover switch 174 to be converted into the three primary color signals of R, G, B, and the picture is diplayed in color on a color monitor 176 capable of corresponding with R, G, B.

The first and second changeover switches 173 can be changed over upon application of, for instance, an "H" signal CS to a control end. This signal CS can be produced by an ON/OFF switch 177 provided in the television camera 155. If this switch 177 is turned ON, the signal assumes "H" level, the changeover switches 173, 174 are selected to the sides of contacts a, and the color difference signals R-Y, B-Y are converted into the saturation-enhanced color difference signals (R-Y)', (B-Y)' by the color enhancing circuit 1. These color difference signals (R-Y)', (B-Y)' are displayed in color on the monitor 176 through the inverse matrix circuit 175.

On the other hand, if the switch 177 is turned OFF, the changeover switches 173, 174 are selected to the sides of contacts b, as shown in FIG. 28, and a picture of the object is displayed in color by means of the unprocessed color difference signals R-Y, B-Y which are not passed through the color enhancing circuit 1.

With this endoscope apparatus 151, the operator is capable of controlling the on/off operation of color enhancement, and it is advantageous since the control can be effected close at hand.

Figure 29:
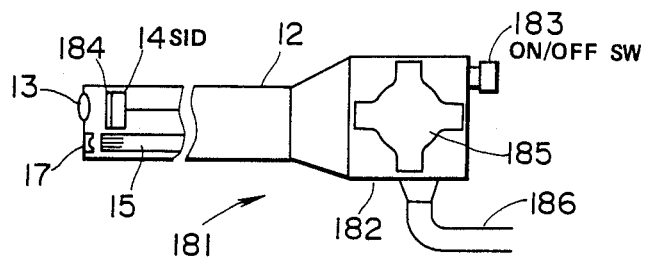
FIG. 29 is a side elevational view of an electronic endoscope provided with an on-off control means for enhancing color.

This endoscope apparatus 151 is arranged such that the switch 177 for effecting the on/off control of color enhancement is provided in the television camera 155 mounted on the eyepiece section 153 of the optical endoscope 152. However, the present invention can also be applied to an arrangement in which, as shown in FIG. 29, an ON/OFF switch 183 which is capable of controlling the on/off operation of color enhancement is provided in an operating section 182 of an electronic endoscope 181. The electronic endoscope shown in FIG. 29 is substantially identical with one in which, in the electronic endoscope 9 shown in FIG. 6, a mosaic filter 184 is provided on the image sensing surface of the solid-state image sensing device 14, and the corresponding identical elements are denoted by identical reference numerals in FIG. 29. A curvicular operating knob 185 is ordinarily provided on the operating section 182 in which the ON/OFF switch 183 is provided. As this knob 185 is rotated, it is possible to bend the distal end side of the insertion section 12 vertically or horizontally, thereby allowing the direction of the field of view to be altered. A signal cable of the SID 14, a control line of the ON/OFF switch 183, and the light guide 15 are inserted through a universal cord 186 extending from the operating section 182. A signal connector (not shown) of this universal cord 186 can be connected to the signal processor 156 shown in FIG. 28, and the incident end of the light guide 15 can be connected to the light source device 159.

It should be noted that it is possible to configure different embodiments by partially combining the above-described embodiments.

In addition, as many apparently different embodiments of the present invention may be made without departing from the spirit and scope thereof, it is to be understood that the invention is not limited to the specific embodiments thereof except as defined in the appended claims.

What is claimed is:

1. A color enhancing circuit comprising:
   chrominance signal modulating means for modulating chrominance signals constituting a color image and for outputting modulated chrominance signals;
   color designating means for designating a phase of a signal used in modulation and for outputting a designated chrominance signal for modulation corresponding to said phase;
   hue difference detecting means for detecting a hue difference between said modulated chrominance signals and said designated chrominance signal for modulation; and
   saturation enhancing means coupled to said hue difference detecting means for enhancing the saturation of a portion of said chrominance signals constituting said color image where said hue difference is small.

2. A color enhancing circuit according to claim 1, wherein said hue difference detecting means has means for setting a saturation enhancing width to determine whether or not said hue difference is within a range of hue level in which saturation enhancement is to be effected.

3. A color enhancing circuit according to claim 2, wherein said hue difference detecting means has means for varying an amount of enhancement of saturation for varying the amount of said saturation enhancement of said portion of chrominance signals which is determined by said saturation enhancing width setting means to be within said range of hue level.

4. A color enhancing circuit according to claims 1, 2, or 3, wherein said modulating means is comprised of two multipliers for multiplying two quadrature chrominance signals by a sine wave and a cosine wave, respectively, and an adder for adding the two multiplied signals to produce said modulated chrominance signals.

5. A color enhancing circuit according to claims 1, 2, or 3, wherein said color designating means is comprised of a phase shifter for shifting the phase of said signal used for modulation by said modulation means to produce said designated chrominance signal.

6. A color enhancing circuit according to claim 1, wherein said hue difference detecting means is comprised of two comparators in which said modulated chrominance signals and said designated chrominance signal for modulation are applied to one end of each of said comparators and a zero voltage is applied to the other end therefor, respectively; a flip-flop in which outputs of said comparators are applied to a set terminal and reset terminal thereof, respectively, and which is to output a pulse of a width corresponding to a phase difference between said modulated chrominance signals and said designated chrominance signal for modulation; a slice circuit for slicing an output of said flip-flop to a constant width; a low-pass filter for extracting a low-band signal component from a signal which has passed through said slice circuit; and a subtractor for subtracting a predetermined value from a signal which has passed through said low-pass filter and to generate a signal proportional to a phase difference between said modulated chrominance signals and said designated chrominance signal for modulation.

7. A color enhancing circuit according to claim 2, wherein said means for setting the saturation enhancing width is comprised of a window-type comparator which outputs binary signals depending on whether or not the level of a signal corresponding to said hue difference is within two predetermined levels.

8. A color enhancing circuit according to claim 7, wherein said two predetermined levels can be set by a variable resistor such as to be variable.

9. A color enhancing circuit according to claim 3, wherein said means of varying the amount of saturation enhancement is comprised of output level varying means for shifting the level of an output signal of said means of setting the saturation enhancing width.

10. A color enhancing circuit according to claim 2 or 3, wherein said saturation enhancing means is comprised of a multiplier which multiplies said portion of chrominance signals and an output signal of said hue difference detecting means.

11. A color enhancing circuit according to claim 1, wherein said hue difference detecting means has hue difference expanding means for expanding said hue difference.

12. A color enhancing circuit according to claim 11, wherein said saturation enhancing means has hue enhancing means for enhancing the hue by means of an output signal of said hue difference expanding means.

13. A color enhancing circuit according to claim 11, wherein said hue difference expanding means is comprised of an A/D converter for subjecting a signal corresponding to said hue difference to A/D conversion, read-only memory means for reading a sine value and a cosine value of a rotational angle by using an output signal of said A/D converter as an address, and a D/A converter for subjecting to D/A conversion a digital signal read by said read-only memory means.

14. A color enhancing circuit according to claim 13, wherein said hue difference expanding means has a digital switch which outputs an address signal which is capable of setting the magnitude of said rotational angle with respect to said read-only memory means such as to be variable.

15. A color enhancing circuit according to claim 12, wherein said hue difference detecting means has a digital switch which outputs an address signal which is capable of setting the magnitude of the amount of saturation 16. A color enhancing circuit according to claim 7 wherein said hue difference detecting means includes an absolute value signal generating circuit for generating an absolute value signal for said modulated chrominance signals; a low-pass filter for extracting a low-band signal from said absolute value signal of said absolute value signal generating circuit; a multiplier for multiplying said low-band signal with a luminance signal constituting said color image; an analog switch in which an output signal of said multiplier is applied to one input terminal thereof and which is to control an ON/OFF operation with an output of said window-type comparator; and an integrating circuit which integrates said low-band signal which has passed through said low-pass filter to obtain an averaged luminance signal and is to apply said averaged luminance signal to the other input terminal of said analog switch.

17. A color enhancing circuit according to claim 2, wherein said means of setting the saturation enhancing width is to output a signal for reducing the saturation of said modulated chrominance signals which falls outside said range of hue level.

18. An electronic endoscope apparatus comprising:
an electronic endoscope including an elongated insertion section, illumination light applying means for applying illumination light from a tip portion side of said insertion section, and image sensing means including an image-forming optical system for forming an optical image of an object illuminated with said illumination light and a solid-state image sensing element for photoelectrically transducing said optical image;
chrominance signal generating means for generating a chrominance signal from an output signal of said solid-state image sensing device;
a color enhancing circuit according to claim 1, 2, or 3;
video signal processing means for converting into a chrominance signal for color representation a chrominance signal the saturation at least of which is enhanced through said color enhancing circuit; and
a color monitor for displaying an image in color by means of an output signal of said video signal processing means.

19. An electronic endoscope apparatus according to claim 18, wherein said electronic endoscope is an electronic scope in which said image sensing means is provided in said insertion section.

20. An electronic endoscope apparatus according to claim 18, wherein said electronic endoscope is comprised of an endoscope of a type having a television camera externally mounted thereon in which a television camera incorporating said image sensing means is mounted on a eyepiece section of an optical endoscope.

21. An electronic endoscope apparatus according to claim 18, further comprising changeover means for cases where chrominance signals are allow to pass through said color enhancing circuit and where chrominance signals are made to bypass said color enhancing circuit.

22. An electronic endoscope apparatus according to claim 21, wherein said changeover means is provided with means for remotely-controlling said image sensing means disposed in the vicinity thereof.

23. An electronic endoscope apparatus according to claim 22, wherein said remote controlling means is installed in a controlling section of said electronic endoscope in which said image sensing means is provided in said insertion section, an operating section being provided at a rear end side of said insertion section.

* * * * *

UNITED STATES PATENT AND TRADEMARK OFFICE
CERTIFICATE OF CORRECTION

PATENT NO. : 4,953,011

DATED : August 28, 1990

INVENTOR(S) : Takeshi MORI et al.

It is certified that error appears in the above-identified patent and that said Letters Patent is hereby corrected as shown below:

Add new column 17, to add claims 24-27, as follows:

--24. A color enhancing circuit according to claim 1 further comprising:
  window-type comparing means which, by effecting a comparison as to whether an output signal of said hue difference detecting means is within two levels, designates a color of said chrominance signals whose saturation is to be enhanced with a mean value of said two levels and is therein to set a saturation enhancing width for effecting saturation enhancement of said color within said two levels.--

--25. A color enhancing circuit according to claim 1 further comprising:
  position designating means for designating a position in a display screen on which said color image is displayed, and said color designating means includes
  means for generating said designated chrominance signal corresponding to a color on said display screen designated by said position designating means, and
  designated chrominance signal modulating means for modulating said designated chrominance signal and for outputting said designated modulated chrominance signals.--

--26. A color enhancing circuit according to claim 25, wherein said position designating means is comprised of a light pen.--

UNITED STATES PATENT AND TRADEMARK OFFICE
CERTIFICATE OF CORRECTION

PATENT NO. : 4,953,011

DATED : August 28, 1990

INVENTOR(S) : Takeshi MORI et al.

It is certified that error appears in the above-identified patent and that said Letters Patent is hereby corrected as shown below:

--27. A color enhancing circuit according to claim 25, wherein said position designating means is comprises of a mouse.--

Signed and Sealed this

Fourteenth Day of July, 1992

Attest:

DOUGLAS B. COMER

*Attesting Officer*  *Acting Commissioner of Patents and Trademarks*